(12) United States Patent
Baerts et al.

(10) Patent No.: US 10,345,156 B2
(45) Date of Patent: Jul. 9, 2019

(54) TEMPERATURE SENSOR AND METHOD FOR THE PRODUCTION OF A TEMPERATURE SENSOR

(71) Applicant: SENSATA TECHNOLOGIES, INC., Attleboro, MA (US)

(72) Inventors: Christiaan Eugene Eduard Baerts, Paal-Beringen (BG); Valentin Grigorov, Sofia (BG); Asparuh Pavlov Borisov, Pernik (BG); Tsvetomir Latinov Zarkov, Sofia (BG)

(73) Assignee: Sensata Technologies, Inc., Attleboro, MA (US)

( * ) Notice: Subject to any disclaimer, the term of this patent is extended or adjusted under 35 U.S.C. 154(b) by 292 days.

(21) Appl. No.: 15/182,268

(22) Filed: Jun. 14, 2016

(65) Prior Publication Data

US 2017/0003174 A1   Jan. 5, 2017

(30) Foreign Application Priority Data

Jul. 1, 2015 (EP) ..................................... 15174727

(51) Int. Cl.
*G01K 7/00* (2006.01)
*G01M 15/10* (2006.01)
(Continued)

(52) U.S. Cl.
CPC .................. *G01K 7/00* (2013.01); *G01K 1/08* (2013.01); *G01K 7/22* (2013.01); *G01K 13/02* (2013.01);
(Continued)

(58) Field of Classification Search
CPC ............ G01K 7/00; G01K 13/02; G01K 1/08; G01K 7/22; G01K 2013/024; G01K 2205/04; G01M 15/102
See application file for complete search history.

(56) References Cited

U.S. PATENT DOCUMENTS 3,691,842 A   9/1972   Akeley
4,080,027 A   3/1978   Benasutti
(Continued)

FOREIGN PATENT DOCUMENTS

CN    103454032 A    12/2013
DE    102004048367 A1    4/2006
(Continued)

OTHER PUBLICATIONS

European Search Report for European Patent Application No. 15174727.6 dated Dec. 21, 2015, 8 pages.

*Primary Examiner* — Daniel S Larkin
*Assistant Examiner* — Anthony W Megna Fuentes
(74) *Attorney, Agent, or Firm* — Burns & Levinson LLP; Joseph M. Maraia; George N. Chaclas

(57) ABSTRACT

A temperature sensor including a mineral-insulated supply line, a bottomed metal tube and a temperature sensing element secured in a support structure. An open end part of the bottomed metal tube is connected mechanically to the mineral-insulated supply line. A wire connection mechanically and electrically couples the temperature sensing element to the mineral-insulated supply line. The support structure is moveable in axial direction of the bottomed metal tube in a bottom end part of the bottomed metal tube.

8 Claims, 4 Drawing Sheets

(51) Int. Cl.
    *G01K 13/02* (2006.01)
    *G01K 1/08* (2006.01)
    *G01K 7/22* (2006.01)

(52) U.S. Cl.
    CPC ..... *G01M 15/102* (2013.01); *G01K 2013/024* (2013.01); *G01K 2205/04* (2013.01)

(56) References Cited

U.S. PATENT DOCUMENTS

| | | |
|---|---|---|
| 4,131,088 A | 12/1978 | Reddy |
| 4,274,125 A | 6/1981 | Vogel |
| 4,347,745 A | 9/1982 | Singh |
| 4,716,492 A | 12/1987 | Charboneau et al. |
| 4,875,135 A | 10/1989 | Bishop et al. |
| 4,955,380 A | 9/1990 | Edell |
| 4,984,461 A | 1/1991 | Haynes |
| 5,000,048 A | 3/1991 | Kordts |
| 5,189,591 A | 2/1993 | Bernot |
| 5,193,912 A | 3/1993 | Saunders |
| 5,231,301 A | 7/1993 | Peterson et al. |
| 5,259,248 A | 11/1993 | Ugai et al. |
| 5,308,249 A | 5/1994 | Renn et al. |
| 5,388,997 A | 2/1995 | Grange et al. |
| 5,388,998 A | 2/1995 | Grange et al. |
| 5,427,553 A | 6/1995 | Tsuji |
| 5,443,394 A | 8/1995 | Billman et al. |
| 5,625,151 A | 4/1997 | Yamaguchi |
| 5,676,559 A | 10/1997 | Laub et al. |
| 5,800,186 A | 9/1998 | Ramirez et al. |
| 5,974,893 A | 11/1999 | Balcarek et al. |
| 6,003,379 A | 12/1999 | Ichikawa et al. |
| 6,050,862 A | 4/2000 | Ishii |
| 6,182,644 B1 | 2/2001 | Kotwicki et al. |
| 6,313,523 B1 | 11/2001 | Morris et al. |
| 6,341,962 B1 | 1/2002 | Sinclair |
| 6,363,922 B1 | 4/2002 | Romzek et al. |
| 6,412,977 B1 | 7/2002 | Black et al. |
| 6,418,793 B1 | 7/2002 | Pechoux et al. |
| 6,473,711 B1 | 10/2002 | Sittler et al. |
| 6,625,029 B2 | 9/2003 | Bernini |
| 6,639,505 B2 | 10/2003 | Murata et al. |
| 6,666,691 B2 | 12/2003 | Ikeya |
| 6,701,790 B2 | 3/2004 | Fortner et al. |
| 6,746,150 B2 | 6/2004 | Wienand et al. |
| 6,776,668 B1 | 8/2004 | Scyoc et al. |
| 6,790,065 B2 | 9/2004 | Fukunaga |
| 6,829,820 B2 | 12/2004 | Adachi et al. |
| 6,848,928 B2 | 2/2005 | Ikeya et al. |
| 6,880,969 B2 * | 4/2005 | Adachi .................. G01K 7/22 338/25 |
| 6,952,042 B2 | 10/2005 | Stratton et al. |
| 7,000,478 B1 | 2/2006 | Zwollo et al. |
| 7,073,375 B2 | 7/2006 | Parker et al. |
| 7,077,008 B2 | 7/2006 | Pham et al. |
| 7,197,936 B2 | 4/2007 | Baba |
| 7,270,011 B2 | 9/2007 | Vossenberg |
| 7,288,005 B2 | 10/2007 | Nagahashi |
| 7,316,164 B2 | 1/2008 | Toyoda et al. |
| 7,434,470 B2 | 10/2008 | Engelhardt et al. |
| 7,464,604 B2 | 12/2008 | Takeuchi et al. |
| 7,467,891 B2 | 12/2008 | Gennissen et al. |
| 7,507,024 B2 | 3/2009 | Takahashi |
| 7,513,806 B2 | 4/2009 | Noda et al. |
| 7,568,835 B2 | 8/2009 | Pils et al. |
| 7,578,194 B1 | 8/2009 | Hadjiloucas et al. |
| 7,591,186 B1 | 9/2009 | Boyer |
| 7,597,668 B2 | 10/2009 | Yarden |
| 7,628,078 B2 | 12/2009 | Matsui et al. |
| 7,651,366 B2 | 1/2010 | Ringler et al. |
| 7,666,000 B1 | 2/2010 | Hsiao et al. |
| 7,666,016 B2 | 2/2010 | Kobayashi |
| 7,695,285 B2 | 4/2010 | Sugiura et al. |
| 7,743,662 B2 | 6/2010 | Kurtz |
| 7,762,140 B2 | 7/2010 | Girroir et al. |
| 7,887,355 B2 | 2/2011 | Watanabe |
| 7,938,783 B2 | 5/2011 | Fraden |
| 7,946,855 B2 | 5/2011 | Osato |
| 7,976,326 B2 | 7/2011 | Stoner |
| 7,992,445 B2 | 8/2011 | Kobayashi et al. |
| 8,038,345 B2 | 10/2011 | Stoll et al. |
| 8,069,729 B2 | 12/2011 | Dannhauer et al. |
| 8,109,250 B2 | 2/2012 | Ramond et al. |
| 8,132,464 B2 | 3/2012 | Broden et al. |
| 8,161,820 B2 | 4/2012 | Yoneda et al. |
| 8,171,800 B1 | 5/2012 | Chiou |
| 8,192,078 B2 | 6/2012 | Gebauer et al. |
| 8,215,176 B2 | 7/2012 | Ding et al. |
| 8,234,927 B2 | 8/2012 | Schulte et al. |
| 8,263,879 B2 | 9/2012 | Hougham et al. |
| 8,328,419 B2 | 12/2012 | Wienand et al. |
| 8,373,430 B1 | 2/2013 | Sochor |
| 8,385,080 B2 | 2/2013 | Kim et al. |
| 8,388,365 B2 | 3/2013 | Takahashi et al. |
| 8,474,322 B1 | 7/2013 | Shapiro |
| 8,505,386 B2 | 8/2013 | Colombo et al. |
| 8,523,432 B2 | 9/2013 | Mujumdar et al. |
| 8,535,079 B2 | 9/2013 | Wang et al. |
| 8,545,240 B2 | 10/2013 | Casher et al. |
| 8,556,638 B2 | 10/2013 | Tsubaki et al. |
| 8,671,765 B2 | 3/2014 | Tokuda et al. |
| 8,734,190 B2 | 5/2014 | Schlitzkus et al. |
| 8,758,067 B2 | 6/2014 | Rathburn |
| 8,764,464 B2 | 7/2014 | Buck et al. |
| 8,887,580 B2 | 11/2014 | Nishikawa et al. |
| 8,893,562 B2 | 11/2014 | Barraco et al. |
| 8,919,656 B2 | 12/2014 | Eckerdt |
| 2002/0029639 A1 | 3/2002 | Wagner et al. |
| 2002/0071475 A1 | 6/2002 | Betzner et al. |
| 2002/0189334 A1 | 12/2002 | Ford et al. |
| 2003/0109163 A1 | 6/2003 | Shimada |
| 2003/0147452 A1 * | 8/2003 | Adachi .................. G01K 13/02 374/185 |
| 2004/0020300 A1 | 2/2004 | Boehler et al. |
| 2004/0114664 A1 | 6/2004 | Park |
| 2004/0182145 A1 | 9/2004 | Okazaki et al. |
| 2005/0061063 A1 | 3/2005 | Haussner et al. |
| 2005/0150301 A1 | 7/2005 | Skinner et al. |
| 2005/0233614 A1 | 10/2005 | Gattuso et al. |
| 2006/0053875 A1 | 3/2006 | Haussner et al. |
| 2006/0090566 A1 | 5/2006 | Oda |
| 2006/0214202 A1 | 9/2006 | Zorich et al. |
| 2006/0218997 A1 | 10/2006 | Yamada et al. |
| 2006/0278012 A1 | 12/2006 | Fujimoto et al. |
| 2007/0071065 A1 | 3/2007 | Pils et al. |
| 2007/0110124 A1 | 5/2007 | Shiraki et al. |
| 2007/0113660 A1 | 5/2007 | Matsui |
| 2007/0148788 A1 | 6/2007 | Hsieh et al. |
| 2007/0193362 A1 | 8/2007 | Ferguson |
| 2007/0203650 A1 | 8/2007 | Jensen et al. |
| 2007/0237205 A1 | 10/2007 | Hayashi |
| 2008/0053237 A1 | 3/2008 | Matsui et al. |
| 2008/0083283 A1 | 4/2008 | Takeuchi et al. |
| 2008/0112462 A1 | 5/2008 | Sisk et al. |
| 2008/0149079 A1 | 6/2008 | Jefford et al. |
| 2008/0205484 A1 * | 8/2008 | Toudou .................. G01K 1/08 374/185 |
| 2008/0216786 A1 | 9/2008 | Ramond et al. |
| 2008/0219319 A1 | 9/2008 | Buckalew |
| 2009/0008092 A1 | 1/2009 | Haeberle et al. |
| 2009/0080492 A1 | 3/2009 | Takeuchi |
| 2009/0095059 A1 | 4/2009 | Matsui et al. |
| 2009/0110029 A1 * | 4/2009 | Bradley .................. G01K 1/18 374/208 |
| 2009/0194831 A1 | 8/2009 | Casey et al. |
| 2009/0279586 A1 * | 11/2009 | Suzuki .................. G01K 1/12 374/185 |
| 2009/0320576 A1 | 12/2009 | Borgers et al. |
| 2010/0002745 A1 | 1/2010 | Stoll et al. |
| 2010/0147822 A1 | 6/2010 | Burrows et al. |
| 2010/0284437 A1 * | 11/2010 | Stoll .................. F16B 33/02 374/143 |
| 2011/0019373 A1 | 1/2011 | Ryhanen et al. |
| 2011/0019714 A1 | 1/2011 | Perry |
| 2011/0032971 A1 | 2/2011 | Reiter |

(56) References Cited

U.S. PATENT DOCUMENTS

| | | |
|---|---|---|
| 2011/0101844 A1 | 5/2011 | Glaser et al. |
| 2011/0201221 A1 | 8/2011 | Kobayashi |
| 2011/0290539 A1 | 12/2011 | Willner et al. |
| 2012/0006119 A1 | 1/2012 | Broden et al. |
| 2012/0063488 A1* | 3/2012 | Nakayama ............... G01K 1/10 374/185 |
| 2013/0004116 A1 | 1/2013 | Ruggiero et al. |
| 2013/0201230 A1 | 8/2013 | Sugahara et al. |
| 2013/0264664 A1 | 10/2013 | Nimura et al. |
| 2013/0317388 A1 | 11/2013 | Bieberich et al. |
| 2014/0060015 A1 | 3/2014 | Yan et al. |
| 2014/0165735 A1 | 6/2014 | Kurtz et al. |
| 2014/0216173 A1 | 8/2014 | Chana |
| 2014/0260648 A1 | 9/2014 | Aoyama et al. |
| 2014/0324323 A1 | 10/2014 | Gates et al. |
| 2014/0341255 A1 | 11/2014 | Kaiser et al. |
| 2014/0345374 A1 | 11/2014 | Morselli et al. |
| 2015/0045971 A1 | 2/2015 | Endel et al. |
| 2015/0072543 A1 | 3/2015 | Willner et al. |
| 2015/0192478 A1 | 7/2015 | Rueth et al. |
| 2015/0204733 A1 | 7/2015 | Newell et al. |
| 2016/0195415 A1 | 7/2016 | Lull |

FOREIGN PATENT DOCUMENTS

| | | |
|---|---|---|
| EP | 350612 A2 | 1/1990 |
| EP | 893676 A2 | 1/1999 |
| EP | 1074827 A2 | 2/2001 |
| EP | 2075557 A2 | 7/2009 |
| EP | 2138819 A1 | 12/2009 |
| EP | 2410306 A2 | 1/2012 |
| FR | 3035500 | 10/2016 |
| GB | 1461574 | 1/1977 |
| JP | 2001093634 A | 4/2001 |
| JP | 2002014113 A | 1/2002 |
| JP | 2002170617 A | 6/2002 |
| JP | 2003100375 A | 4/2003 |
| JP | 2010153321 A | 7/2010 |
| JP | 2010256187 A | 11/2010 |
| JP | 4854612 B2 | 1/2012 |
| WO | WO-9508758 A1 | 3/1995 |
| WO | WO-2004066194 A1 | 8/2004 |
| WO | WO-2005052535 A1 | 6/2005 |
| WO | WO-2006102460 A1 | 9/2006 |
| WO | WO-2011094753 A2 | 8/2011 |
| WO | WO-2014042264 A1 | 3/2014 |

\* cited by examiner

TEMPERATURE SENSOR AND METHOD FOR THE PRODUCTION OF A TEMPERATURE SENSOR

CROSS-REFERENCE TO RELATED APPLICATION

This application claims priority to and the benefit of European Patent Application No. EP15174727 filed Jul. 1, 2015, which is incorporated herein by reference.

TECHNICAL FIELD

The subject technology relates to temperature sensors and, more particularly to high-temperature sensors, e.g. an exhaust gas temperature sensor. The subject technology further relates to a method for the production of a temperature sensor.

BACKGROUND

Most of the time high temperature sensors consist of an outer sheeting which is exposed to the medium to be measured. More specifically, this is the case with exhaust gas temperature sensors where the outer sheet is in contact with the exhaust gas while the internal temperature sensing element is in contact with an internal medium conducting and transferring the heat-flux from the outside to the inside. The internal temperature sensing element could be a positive temperature coefficient (PTC) thermistor or negative temperature coefficient (NTC) thermistor.

High temperature sensors are affected by very high heating and cooling gradients. The gradients lead to excessive compressive and tensile stresses between several materials of the internal components, connections and leads. The stresses could lead to damage of the internal components and conductors carrying the output signal representing the temperature sensed by the internal temperature sensing element.

U.S. Pat. No. 6,639,505 B2 discloses a temperature sensor wherein the distance between a thermistor element and a metal enclosure is not larger than 0.3 mm and the thermistor element and metal enclosure are in contact with each other via an insulating member. The insulating member may be a crystallized glass or a ceramic. The insulating member eliminates undesired gaps among the thermistor element and metal enclosure.

U.S. Pat. No. 6,829,820 B2 discloses a method of manufacturing a temperature sensor. A thermistor element is inserted into a bottomed metal tube while filling an inside of the metal tube with a filler material, preferably of silicone oil, to reduce a sliding resistance between the thermistor element and the metal tube as an integral temperature sensing structure which is then mounted in a housing. The metal tube is heated after insertion of the thermistor element there in so as to volatize an oil component of the silicone oil. The method reduces the defects due to bending of the electrode wires of the thermistor during placement of the thermistor in the metal tube.

In the temperature sensors described above stresses on the conductors caused by changes in temperature and vibrations between the measurement resistor and the supply-line cable lead to wear on the conductors. In U.S. Pat. No. 8,328,419 B2, a solution to this problem is disclosed. Heat-decoupling wires are arranged between the measurement resistor and strands of the supply-line cable. The heat decoupling wires are stuck as spiral springs on the strands of the mineral insulated supply line cable and connect elastically the measurement resistor to the supply-line cable.

SUMMARY

It is an object of the present technology to provide an improved temperature sensor which is at least one of: reliable; cheaper to manufacture; producible in high volume by means of semi- or full automatic production processes; long lasting; and withstanding of the high temperature and vibration typical of an internal combustion engine.

According to a first aspect of the subject technology, at least one of these objects is achieved by a temperature sensor having the features of claim 1. Advantageous embodiments and further ways of carrying out the subject technology may be attained by the measures mentioned in the dependent claims.

A temperature sensor according to the subject technology includes a mineral-insulated supply line, a bottomed metal tube and a temperature sensing element contained in said bottomed metal tube. The bottomed metal tube comprises a bottom end part and an open end part. The open end part is connected mechanically to the mineral-insulated supply line. The temperature sensing element is secured in a support structure. The support structure is permanently moveable in the bottom end part in an axial direction of the bottomed metal tube. A wire connection may mechanically and electrically couple the temperature sensing element to the mineral-insulated supply line.

The basic idea is to reduce the stress in the wire connection due to the very high heating and cooling gradients which leads to excessive compressive and tensile stresses between several materials of the internal components and connection leads between the mineral insulate supply line and the temperature sensing element. The stress is reduced by mechanically decoupling of the sensing element and the bottom end part of the bottomed metal tube. Due to the different coefficients of thermal expansion (CTE) of the material of the bottomed metal tube and the connection leads and the temperature difference between the bottomed metal tube and the connections leads during rapid temperature changes of the medium to be measured, the temperature sensing element moves in axial direction of the bottomed metal tube in the bottomed metal tune. The forces acting on the connection leads are now limited to the frictional forces between the temperature sensing element and the bottom metal tube. If the temperature sensing element is fixedly put in the bottomed metal tube, the connection leads could be stretched and/or bended with much greater forces each temperature cycle from 200° C. to 850° C. back to 200° C. Over time, these greater forces leads to breakage of a connection leads and reduces the product life time.

In an embodiment, a cross section of the support structure has an outer periphery with a shape similar to an inner periphery of a cross section of a bottom end part of the bottomed metal tube, wherein the outer periphery of the support structure is smaller than the inner periphery of the bottom end part. This feature provides a structure allowing the support structure to move in an axial direction with limited frictional forces and providing sufficient thermal contact between the bottomed metal tube and the support structure for transferring the heat-flux from the outside to the inside due to a predefined maximal gap between the support structure and the bottomed metal tube.

In another embodiment, in axial direction of the bottom end part, a bottom gap is provided between the bottom of the bottomed metal tube and the support structure. The gap ensures that the support structure can move in the axial direction in all circumstances. If the support structure would be forced to the bottom of the tube, the connection leads would be bent resulting in greater compression forces acting on the leads than the frictional forces between support structure and bottomed metal tube. As a result of the greater compression forces, the leads will bent each temperature cycle which will weaken connection leads.

In one embodiment, the support structure comprises a metal cup filled with potting material and the temperature sensing element is positioned in the potting material. Having a metal cup and bottomed metal tube with almost the same coefficient of thermal expansion (CTE) ensures that the frictional forces between the metal cup and bottomed metal tube does not change much over the temperature range.

In another embodiment, the support structure comprises a metal cup filled with potting material and the temperature sensing element is positioned in the potting material. These features provide a simple way to embed the temperature sensing element in a support structure so that outer dimensions to fit in the bottomed metal tube can very accurately be defined.

The support structure may be a body made from a ceramic or cement-compound, which requires fewer components to manufacture the support structure with embedded temperature sensing element.

In still another embodiment, a distal end of the support structure touches a side wall of the bottomed metal tube at a first distance from the bottom of the bottomed metal tube and a proximal end of the support structure touches an opposite side wall of the bottomed metal tube at a second distance from the bottom of the bottomed metal tube. By positioning the support structure at an angle in the end part of the bottom end part, the frictional forces to move the support structure in the axial direction are limited by the stiffness of the connection leads. Furthermore, the support structure has good thermal contact with the bottomed metal tube and the support structure cannot move freely laterally.

In one embodiment, an open end part of the bottomed metal tube is attached to a mineral insulated supply line, the temperature sensing element is connected with a wire connection to strands of the supply line, the support structure is movable in axial direction of the bottomed metal tube with a force of friction, and the wire connection has a stiffness such that the wire connection does not deform when the force of friction is acting in axial direction of the bottomed metal tube on the wire connection. As a result of these features, damage of the wire connection due to the stress in the wire connection caused by the force of friction to move the support structure in axial direction is reduced significantly.

The sensor may include a sliding gap between the support structure and the bottom part of the bottomed metal tube. The sliding gap ensures that the support structure does not get stuck in the bottom end part due to different thermal expansion of the support structure and bottom end part. In a further embodiment, the sliding gap is filled with a non-curing viscous substance. In this way, the wear due to friction between the support structure and the metal bottomed tube is reduced.

In another embodiment, the subject technology is directed to a method for the production of a temperature sensor. The method includes the steps of: embedding a temperature sensing element in a support structure; mechanically coupling the temperature sensing element to strands of a mineral-insulated supply line; positioning the support structure in a bottom end part of a bottomed metal tube; and mechanically connecting the mineral-insulated supply line to an open end part of the bottomed metal tube.

It should be appreciated that the subject technology can be implemented and utilized in numerous ways, including without limitation as a process, an apparatus, a system, a device, and a method for applications now known and later developed. Other features and advantages will become apparent from the following detailed description, taken in conjunction with the accompanying drawings which illustrate, by way of example, various features of embodiments.

BRIEF DESCRIPTION OF THE DRAWINGS

These and other aspects, properties and advantages will be explained hereinafter based on the following description with reference to the drawings, wherein like reference numerals denote like or comparable parts, and in which.

DESCRIPTION OF EMBODIMENTS

Figure 1:
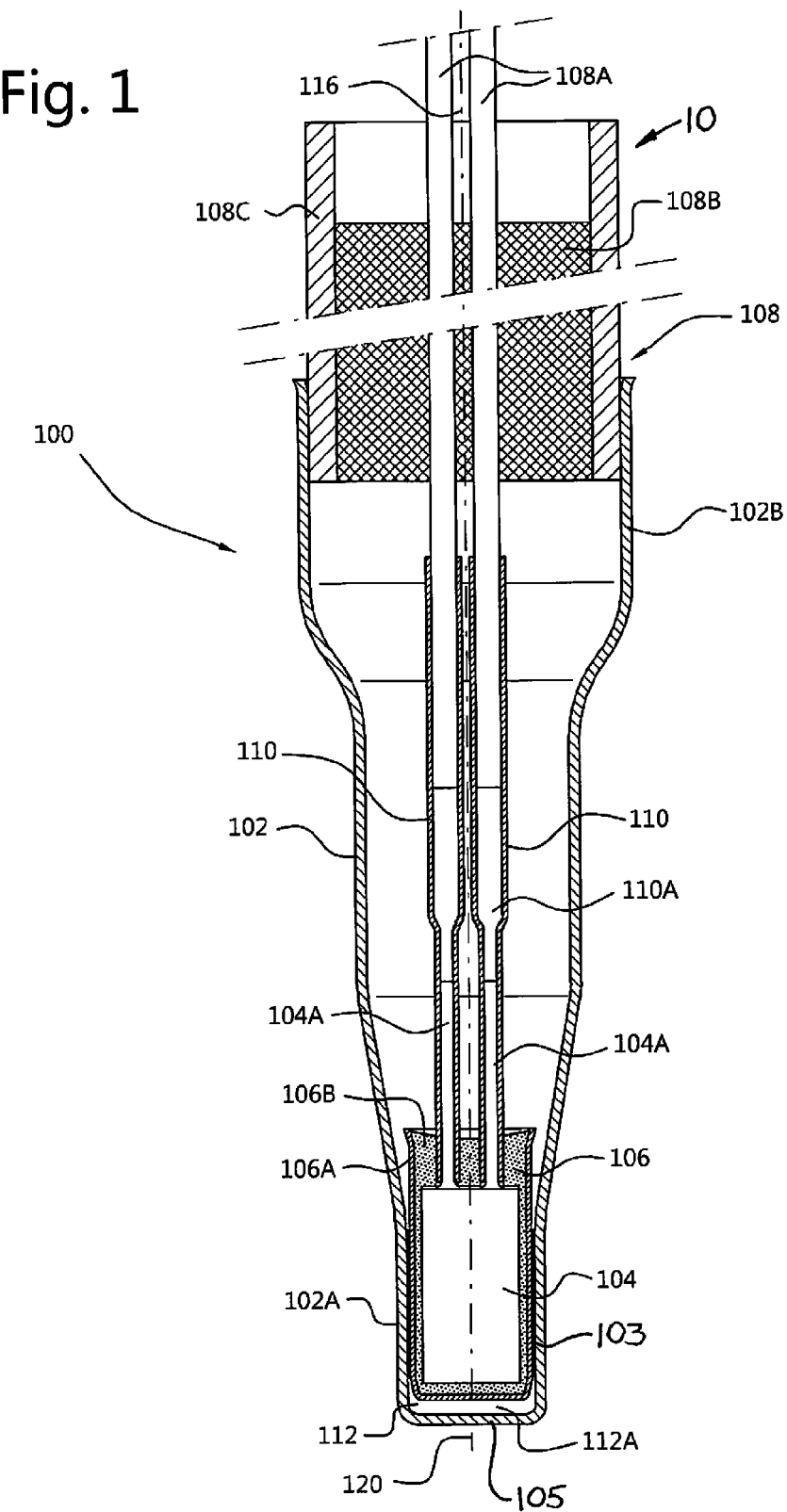
FIG. 1 is a schematic sectional view of a first embodiment of a high temperature sensor in accordance with the subject technology.

The subject technology overcomes many of the prior art problems associated with high-temperature sensors. The advantages, and other features of the technology disclosed herein, will become more readily apparent to those having ordinary skill in the art from the following detailed description of certain preferred embodiments taken in conjunction with the drawings which set forth representative embodiments of the present technology and wherein like reference numerals identify similar structural elements. Directional indications such as upward, downward, right, left and the like are used with respect to the figures and not meant in a limiting manner.

FIG. 1 shows a schematic sectional view of a tip 100 of a first embodiment of a temperature sensor 10. The temperature sensor 10 is especially suitable for measuring high temperatures such as up to 900° C. The temperature sensor 10 could be an exhaust gas temperature sensor. The subject technology discloses a solution to increase the lifetime on closed housing sensors on thermal cycling. The temperature in an exhaust pipe can vary quickly between 200° C.-900° C.

The temperature sensor 10 includes a bottomed metal tube 102 with a bottom end part 102A having a closed bottom 105 and an open end part 102B. The bottomed metal tube 102 forms an outer sheeting shape that is exposed to the medium to be measured. The bottomed metal tube 102 forms an interior in which a temperature sensing element 104 is provided. The temperature sensing element 104 could be a PTC or NTC device. The temperature sensing element 104 is positioned in a metal cup 106A. The space between the metal cup 106A and the temperature sensing element 104 is filled with a potting material 106B to form a support structure 106. Any material that has a good heat transfer characteristic to transfer the heat-flux from outside to the inside could be used as the potting material 106B. The potting material 106B can fix the sensing element 104 in the metal cup 106A. Examples of suitable potting material 106B are alumina, zirconia, magnesia or other metal oxides, ceramics and/or cement-compounds.

The conductors 104A of the temperature sensing element 104 are electrically and mechanically coupled to strands 108A of a mineral-insulated supply line 108 by means of a wire connection. The conductors 104A and strands 108A could be coupled by soldering. In one embodiment, the conductors 104A of the temperature sensing element 104 are plated wires with a diameter in the range of 0.2-0.3 mm. In FIG. 1, a conductive tube-shaped structure 110 is used on each conductor 104a to couple the conductors 104A of the temperature sensing element 104 to the strands 108A of the supply line 108. At one end of the conductive tube-shaped structure 110, a conductor 104A of the temperature sensing element 104 is affixed to the conductive tube-shaped structure 110. The conductor 104A is slid in the opening of the structure 110 and subsequently affixed by for example crimping or welding. In a similar way, a strand 108A of the mineral-insulated supply line 108 is affixed to the conductive tube shaped structure 110. Preferably, an empty space 110A in each tube-shaped structure 110 extends between the conductors 104A and the strands 108A for separation.

Mineral-insulated supply lines or strands are commonly known to the person skilled in the art. A mineral insulated supply strand 108 for example comprises strands 108A made of alloy 601 (60% wt. % Nickel, 21 wt. % Chromium, 15 wt. % Iron, and 1.2 wt. % Aluminium) or other Nickel alloys. The strands 108 can be embedded in a highly compacted mineral powder 108B that is surrounded by a protective metal sleeve 108C made of alloy 601 (60% wt. % Nickel, 21 wt. % Chromium, 15 wt. % Ferro, and 1.2 wt. % Aluminium) or other Stainless Steel alloys like 310H.

The open end 102B of the bottomed metal tube 102 is connected to the metal sleeve 108C of the mineral-insulated supply line 108 such as by crimping, welding and/or other techniques.

The metal cup 104 and the potting material 106B form a support structure 106 in which the temperature sensing element 104 is secured. The metal cup 104 has a cross section with an outer periphery with a shape similar to an inner periphery of a cross section of the bottom end part 102A of the bottomed metal tube 102. The outer periphery of the support structure is smaller than the inner periphery of the bottom end part 102A. In this way, the support structure 106 is permanently moveable in the bottom end part 102a along an axis 120 of the elongated bottomed metal tube 102 because of a sliding gap 103 between the metal cup 106A and the bottom end part 102A. Preferably, the bottomed metal tube 102 narrows toward the bottom end part 102A.

The sliding gap between the support structure 106 and bottomed metal tube 102 is an expansion/contraction gap which absorbs coefficient of thermal expansion (CTE) mismatch and non-isothermal heating during heating or cooling phases. The sliding gap allows movement of the support structure 106 in the bottom end part 102a along the body axis 120 of the bottomed metal tube 102. For example, when the bottomed metal tube 102 heats more quickly than the connections 108A, 110, etc., the support structure 106 will move upward in the bottom end part 102A and a bottom of the bottomed metal tube 102 may move away from a distal tip of the support structure 106. As a result, a bottom gap 112A increases between the bottom of the bottomed metal tube 102 and the distal tip of the support structure 106. The bottom gap 112A ensures that the wire connection is not subjected to compressive stress when the temperature of the medium rapidly cools down and the temperature of the wire connection is much higher than the temperature of the bottomed metal tube 102.

By means of the sliding gap and the bottom gap 112A, the support structure 106 is a "floating" body in the bottomed metal tube 102. This construction wherein the outside sheeting of the metal tube 102 is decoupled from the support structure 106 reduces compressive and tensile stresses in the wire connection with first order exposure to the fluctuating temperature shocks of the measured medium (in one specific case, the exhaust gas) compared with embodiments wherein a temperature sensing element is affixed in a bottomed metal tube. The sliding gap and the bottom gap could be an air gap. However, the gaps could also be filled with a high temperature inert material or a coating like zirconia, alumina, magnesia, or with a gas.

Figure 2:
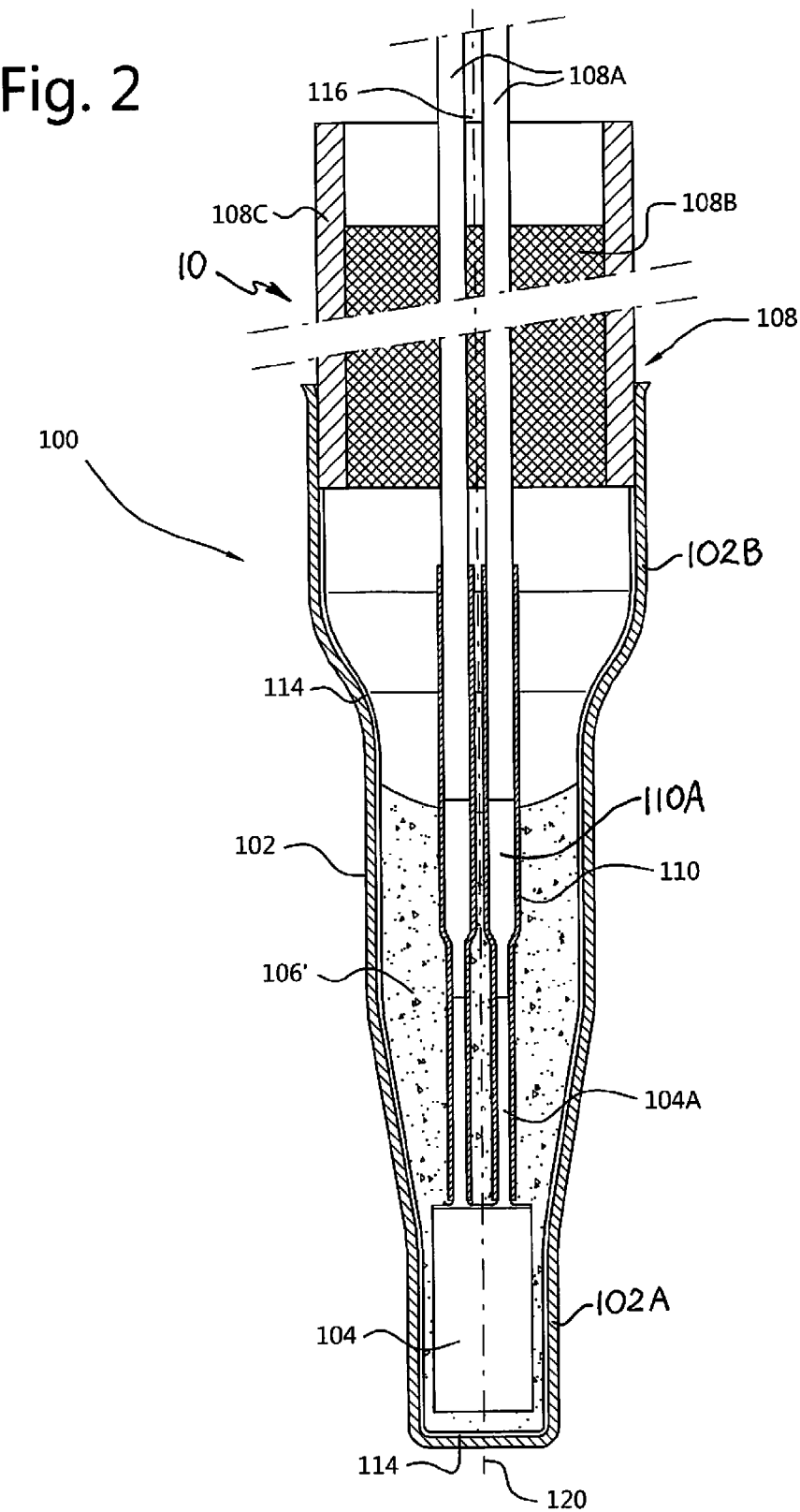
FIG. 2 is a schematic sectional view of a second embodiment of a high temperature sensor in accordance with the subject technology.

FIG. 2 illustrates a sectional view of a second embodiment of a tip 100 of a temperature sensor 100. The tip 100 differs from the first embodiment in FIG. 1 in that the temperature sensing element 104 is embedded in a ceramic or cement structure 106'. The ceramic or cement structure 106' forms in this embodiment a support structure. Any high temperature resistant refractory material could be used as cement structure. Examples of suitable material for the structure 106' are alumina, zirconia, magnesia or other metal oxides, ceramics or cement-compounds. The inner side of bottomed metal tube 102 is covered with a coating 114, which decreases the friction between support structure 106' and the bottomed metal tube 102. An example of material of the coating is Magnesium Stearate. Furthermore, there could be a small sliding gap between the coating and the support structure 106'.

With a sliding gap, the support structure 106' can move laterally in the bottomed metal tube 102. A body axis of the support structure coinciding with the body axis 120 of the bottomed metal tube 102 facilitates the lateral movement and in particular, the body axes coinciding in the bottom end part 102A, which may be relatively narrower. The lateral movement of the support structure 106' could result in wear of the support structure 106' and/or bottomed metal tube 102 and wire connection (e.g., the conductors 104A, the strands 108A, the conductive tubes 110, the joint between the conductors and the temperature sensing element 104 etc.). To reduce the lateral movement of the support structure 106' in the bottomed metal tube 102, before, when or after positioning the support structure 106' in the bottomed metal tube 102, all or a part of the wire connection is slightly bent. As a result of this bending, the support structure 106' is slightly pressed to an inner side of the bottomed metal tube 102.

Figure 3:
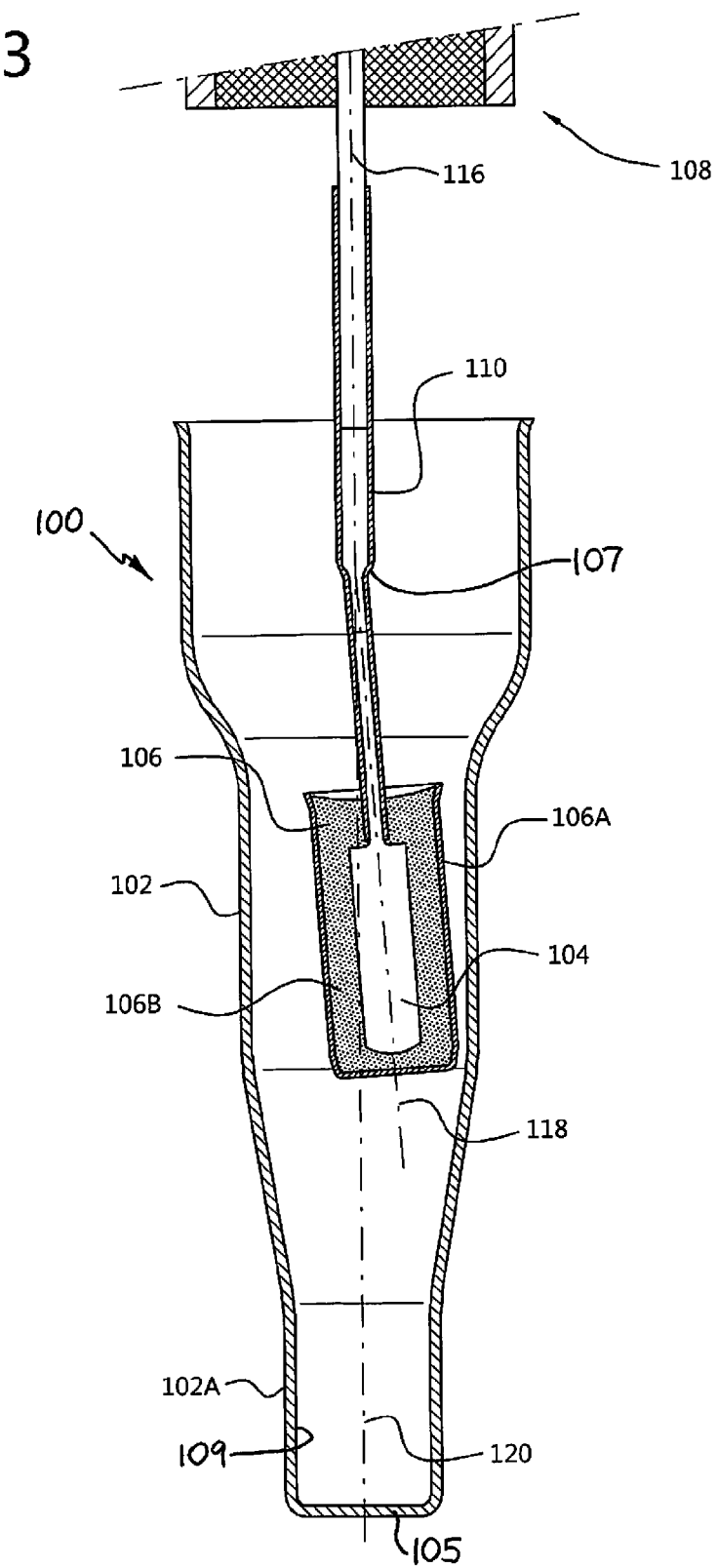
FIG. 3 is a schematic sectional view of a temperature sensor during a state of assembly in accordance with the subject technology.
Figure 4:
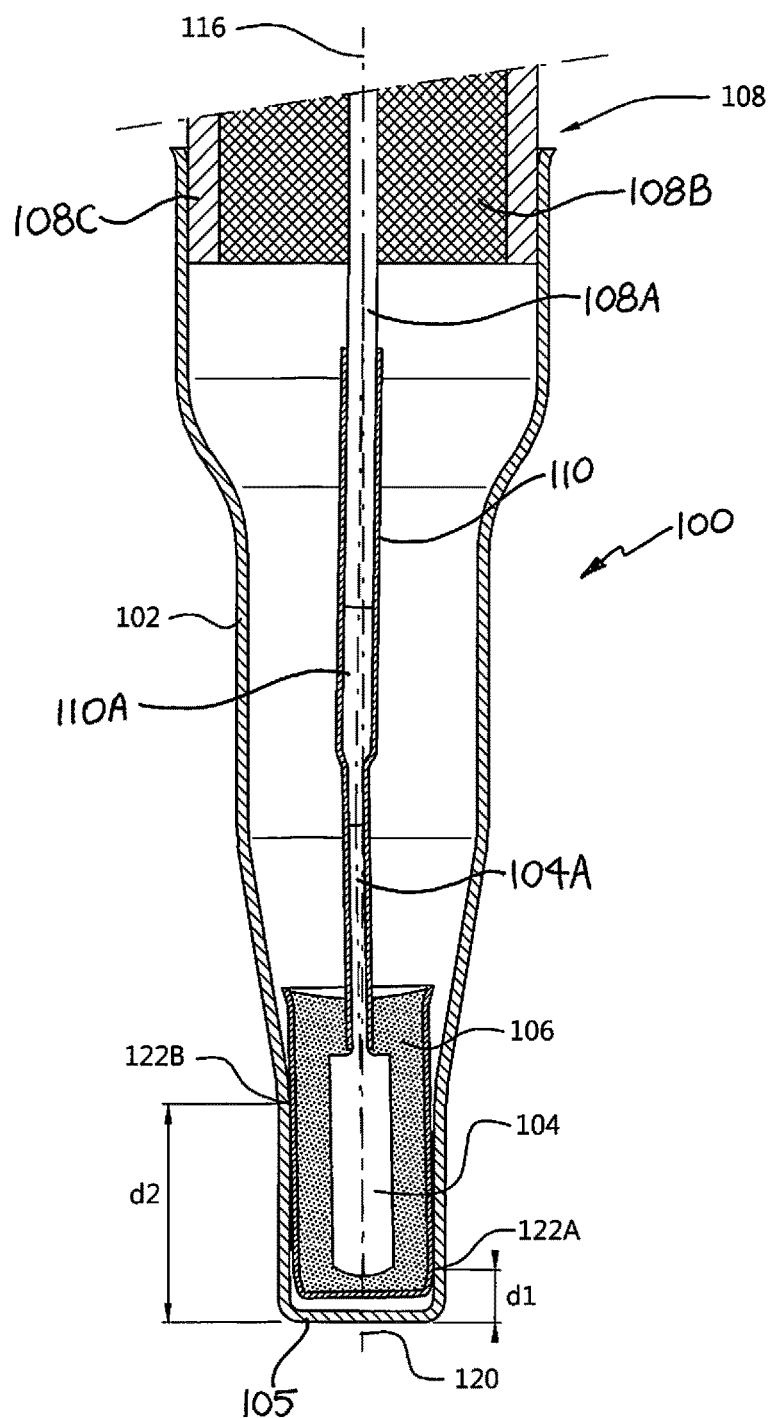
FIG. 4 is a schematic sectional view of the temperature sensor in FIG. 3 after assembly in accordance with the subject technology.

Such bending may be applied to the first embodiment of FIG. 1, FIG. 2 and variations thereof. FIGS. 3 and 4 illustrate an embodiment of how this bending can be achieved.

FIG. 3 illustrates the assembly of mineral-insulated supply line 108, the conductive tube shaped structure 110, the temperature sensing element 104 and the support structure 106 prior to inserting the support structure in the bottom part 102A of the bottomed metal tube 102. At positioning the support structure 102 in the bottom part 102A, the end of the metal-insulated supply line 108 has a body axis 116 which is in line with the body axis 120 of the bottomed metal tube 102. After insertion and connecting the bottomed metal tube 102 to the mineral-insulated supply line 108, it is assumed that the body axis 116, 120 of the bottomed metal tube 102 and mineral-insulated supply line 108 are in line.

However, the support structure 106 has a lower body axis 118, which does not coincide both the body axis 116 of the mineral-insulated supply line 108 or the body axis 120 of the bottomed metal tube 102. In the example of FIG. 3, the lower body axis 118 of the support structure 106 is angled with respect to the body axis 116 of the mineral-insulated supply line 108 by a bend 107 in the wire connection. The temperature sensing element 104 is positioned straight in the support structure 106. It might also be possible to have a straight wire connection and to position the temperature sensing element angled in the support structure. In one embodiment, the angle is in the range of 1-5 degrees but not limited thereto.

When inserting the support structure 106 in the bottom part 102A, the support structure 106 will be forced to have its body axis 118 more in line with the body axis 120 of the bottomed metal tube 102. This is possible by bending the wire connection. It is envisioned that the support structure 106 will slide against the inner sidewall 109 of the bottomed metal tube 102. FIG. 4 illustrates the temperature sensor element 104 after positioning the support structure 106 in the bottomed metal tube 102. A distal end 122A of the support structure 106 touches a side wall of the bottomed metal tube 102 at a first distance d1 from the bottom of the bottomed metal tube 102. A proximal end 122B of the support structure touches an opposing portion of the side wall of the bottomed metal tube 102 at a second distance d2 from the bottom of the bottomed metal tube 102. The lower body axis 118 of the support structure 106 is now almost in line with the body axis 116, 120 of the bottomed metal tube 102 and the mineral-insulated supply line 108. In this way, the support structure 106 is fixed to prevent lateral movement but the support structure 106 still can move axially in the bottomed metal tube 102. The stiffness of the wire connection defines the friction force between support structure 106 and bottomed metal tube 102 and thus the force acting on the wire connection to move the support structure 106 in axial direction in the bottomed metal tube 102.

Preferably, as long as the body axis 118 of the support structure 106 deviates from the body axis 116 of the mineral-insulated supply line 108, the support structure 106 will be positioned in the bottomed metal tube 102 with some limited friction force. The support structure 106 is movable in axial direction of the bottomed metal tube 102 with a force of friction. The wire connection has a stiffness such that the wire connection does not deform when the force of friction is acting on the wire connection.

A method for the production of the temperature sensor described above comprises the following actions: embedding a temperature sensing element in a support structure; mechanically coupling the temperature sensing element to strands of a mineral-insulated supply line to obtain an assembly part; positioning the support structure in a bottom end part of a bottomed metal tube; and, mechanically connecting the mineral-insulated supply line to an open end part of the bottomed metal tube. Preferably, before connecting the bottomed metal tube to the mineral-insulated supply line, the support structure has a body axis which does not coincide with a body axis of a proximal end of the mineral-insulated supply line. After coupling the assembly part to the bottomed metal tube, a body axis of the proximal end of the supply line substantially coincides with a body axis of the bottom metal tube. Before insertion, the body axis of the support structure may be at an angle with respect to the body axis of the proximal end of the supply line.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., tubes, strands, sleeves, coatings and the like) shown as distinct for purposes of illustration may be incorporated within other functional elements in a particular implementation. Further, the floating tip/body can be composed of several materials and take many desirable shapes. The subject technology assembles a temperature sensing element in a bottomed metal tube with reduced compressive and tensile stresses by having the support structure decoupled from the bottomed metal tube which forms the outside sheeting of the temperature sensor. The stresses are reduced with first order exposure to the fluctuating temperature shocks of the measured medium. It is envisioned that the subject technology is particularly applicable to an exhaust gas temperature sensor (EGTS) and other fields and applications. The reduced stress very effectively increases the lifetime of an EGTS.

The disclosed embodiments have all a cylindrical shape. It is envisioned that any other shape might be used which allows axial movement of the support structure in the outer sheet which outer surface will be in contact with the measured medium.

All patents and other references disclosed herein are hereby expressly incorporated in their entireties by reference. While the subject technology has been described in terms of several embodiments, it is contemplated that alternatives, modifications, permutations and equivalents thereof will become apparent to those skilled in the art upon reading the specification and upon study of the drawings. The invention is not limited to the illustrated embodiments, but it is intended to cover modifications within the spirit and scope of the present invention as defined by the appended claims.

The invention claimed is:

1. An assembled temperature sensor comprising: a supply line; an elongated bottomed metal tube with a bottom end part and an open end part, the open end part is connected mechanically to the supply line, wherein a first axis extends from the bottom end part to the open end part; a temperature sensing element being secured in a support structure, contained in said bottomed metal tube, wherein the support structure has a distal end and a proximal end and a second axis extending axially from the distal end to the proximal end, the second axis has an angle with respect to the first axis, and the support structure is capable of moving along the first axis in the bottom end part of the bottomed metal tube; and wherein the distal end of the support structure touches a first point on a first side wall of the bottomed metal tube at a first distance from the bottom of the bottomed metal tube and the proximal end of the support structure touches an opposite second point on a second side wall of the bottomed metal tube at a second distance from the bottom of the bottomed metal tube due to the angle of the second axis with respect to the first axis; wherein the first and second distances are different; and a wire connection mechanically and electrically coupling the temperature sensing element to the supply line.

2. The temperature sensor according to claim 1, wherein a cross section of the support structure has an outer periphery with a shape identical to an inner periphery of a cross section of a bottom end part of the bottomed metal tube; wherein the outer periphery of the support structure is smaller than the inner periphery of the bottom end part.

3. The temperature sensor according to claim 1, wherein in axial direction of the bottom end part, a bottom gap is provided between a bottom of the bottomed metal tube and the support structure.

4. The temperature sensor according to claim 1, wherein the support structure comprises a metal cup filled with potting material and the temperature sensing element is positioned in the potting material.

5. The temperature sensor according to claim 1, wherein the support structure is a body made from a ceramic or cement-compound.

6. The temperature sensor according to claim 1, wherein the open end part of the bottomed metal tube is attached to the supply line, the wire connection is connected to strands of the supply line, the support structure is movable in axial direction of the bottomed metal tube with a force of friction, the wire connection has a stiffness such that the wire connection does not deform when the force of friction is acting on the wire connection.

7. The temperature sensor according to claim 1, wherein a sliding gap is provided between the support structure and the bottom part of the bottomed metal tube.

8. The temperature sensor according to claim 7, wherein the sliding gap is filled with a coating.

* * * * *